United States Patent
Davis

(10) Patent No.: US 7,429,319 B2
(45) Date of Patent: Sep. 30, 2008

(54) SEWAGE SLURRY SEPARATION SYSTEM

(76) Inventor: Rufus Davis, 1535 N. Post Oak, Houston, TX (US) 77055

( * ) Notice: Subject to any disclaimer, the term of this patent is extended or adjusted under 35 U.S.C. 154(b) by 0 days.

(21) Appl. No.: 11/460,137

(22) Filed: Jul. 26, 2006

(65) Prior Publication Data

US 2007/0163938 A1 Jul. 19, 2007

Related U.S. Application Data

(60) Provisional application No. 60/703,725, filed on Jul. 26, 2005.

(51) Int. Cl.
*B01D 21/02* (2006.01)
*E03F 9/00* (2006.01)

(52) U.S. Cl. ............ 210/121; 210/241; 210/416.1; 210/527; 210/537; 15/320; 15/340.1; 134/104.4; 134/168 C

(58) Field of Classification Search ............ 210/121, 210/241, 416.1, 532.1, 527, 536, 537; 15/320, 15/340.1; 134/104.4, 168 C, 167 C
See application file for complete search history.

(56) References Cited

U.S. PATENT DOCUMENTS

| 382,188 | A | * | 5/1888 | Pitt ..................... 210/536 |
| 1,128,253 | A | * | 2/1915 | Kline ................... 210/537 |
| 1,437,007 | A | * | 11/1922 | Otterson ............... 210/241 |
| 3,262,571 | A | * | 7/1966 | Petretti ................ 210/241 |
| RE27,346 | E | * | 4/1972 | Naylor ................. 210/241 |
| 4,134,174 | A | * | 1/1979 | Flynn et al. ........... 15/340.1 |
| 4,322,868 | A | | 4/1982 | Wurster |
| 4,389,314 | A | * | 6/1983 | Petretti ................ 210/241 |
| 4,816,167 | A | * | 3/1989 | Vanderslice ............ 210/241 |
| 4,854,058 | A | * | 8/1989 | Sloan et al. ............ 210/241 |
| 4,975,205 | A | * | 12/1990 | Sloan .................. 210/241 |
| 5,068,940 | A | * | 12/1991 | Sheppard et al. ........ 134/167 C |
| 5,503,753 | A | * | 4/1996 | Woodall et al. ......... 210/532.1 |
| 6,547,964 | B1 | * | 4/2003 | Rajewski .............. 210/241 |

OTHER PUBLICATIONS

International Search Report, issued Sep. 25, 2007 re International Application No. PCT/US06/29295.

* cited by examiner

*Primary Examiner*—Christopher Upton
(74) *Attorney, Agent, or Firm*—Fulbright & Jaworski, LLP

(57) ABSTRACT

The present invention discloses a sewage slurry separation system adapted to assist in sewer cleaning operations. The sewage slurry separation system is configured for collecting sewage slurry from a sewer line, depositing the sewage slurry in a collection/settling chamber to separate the slurry into water and sludge. The water is then pumped back into the sewer line. The system includes a sewage collection tank with a compacting plate. The compacting plate divides the sewage collection tank into a sewage collection chamber and a water collection chamber. The compacting plate has a passage that allows water from the sewage collection chamber to flow into the water collection chamber. The sewage slurry separation system also includes a submersible pump connected to the sewage collection chamber. The submersible pump pumps sewage slurry into the sewage collection chamber.

17 Claims, 2 Drawing Sheets

SEWAGE SLURRY SEPARATION SYSTEM

CROSS-REFERENCE TO RELATED APPLICATIONS

This application claims priority to Provisional Application No. 60/703,725.

TECHNICAL FIELD

The present invention discloses a sewage slurry separation system adapted to assist in sewer cleaning operations. The novel system is configured to collect sewage slurry from a sewer line, separate the slurry into water and sludge, and return the water to a down hole portion of the sewer line. The novel system is further configured with a compactor to compact the sewage slurry and dump it into disposal containers.

BACKGROUND OF THE INVENTION

Sewer lines are cleaned using high pressure water connected to a cleaning head. The cleaning head is inserted into the sewer line at a downstream manhole. Once inserted, the cleaning head is propelled up-stream through the sewer line by the high pressure water. The debris dislodged by the high pressure water is washed downstream and collects in the downstream manhole. Once in the downstream manhole, the debris (sewage slurry) is separated from the water using a sewage slurry separation system. The water separated from the sewage slurry is returned to the sewer line and the remaining sewage slurry is retained for later disposal.

BRIEF SUMMARY OF THE INVENTION

The present invention is directed to a sewage slurry separation system adapted to be mounted on a vehicle chassis. One embodiment of the sewage slurry separation system includes a sewage waste storage tank with a front and a back, a compacting plate movably positioned within said sewage waste storage tank, an upper water pump positioned at the front of said sewage waste storage tank and configured to pump liquid out of said sewage waste storage tank, and a lower water pump positioned at the front of said sewage waste storage tank below said upper water pump and configured to pump liquid out of said sewage waste storage tank.

The system can also include an upper input hose connected to said upper water pump and a lower input hose connected to said lower water pump, wherein the upper and lower input hoses are positioned relative to the sewage waste storage tank to pump dirty water from the sewage slurry out of the sewage waste storage tank. Input in this context means input into the pump.

The sewage slurry separation system can also include a compacting plate that divides the sewage waste storage tank into a water collection chamber and a sewage collection chamber. The compacting plate can include a water discharge channel at the top of the compacting plate.

The system may further include a remotely operated submersible pump configured to discharge sewage slurry into the sewage collection chamber.

The submersible pump of the sewage slurry separation system may also be configured to discharges sewer slurry toward the back of the sewage waste storage tank. Alternatively, the system may be configured to discharge slurry against the sides of the sewage waste storage tank.

The upper water pump described above may be sized to have a pumping capacity less than the pumping capacity of said submersible pump. Additionally, both upper and lower pump may be sized to have a pumping capacity equal to or greater than the pumping capacity of the submersible pump.

The sewage slurry separation system may be mounted on a truck or other mobile platform.

Another embodiment of the sewage slurry separation system includes a sewage waste storage tank, a remotely positionable submersible pump with an input and an output, wherein said output is connected to said sewage waste storage tank, a compacting plate movably positioned inside said sewage waste storage tank, said compacting plate shaped to conform to a portion of said sewage waste storage tank, and a discharge pump configured to pump dirty water out of said sewage waste storage tank.

The sewage slurry separation system may further include a flow input nozzle that directs the sewage slurry from said remotely positionable submersible pump away from said discharge pump as it enters the sewage waste storage tank.

The compacting plate of the system may divide the sewage waste storage tank into a sewage collection chamber and a water collection chamber. In such a configuration, the input nozzle directs input flow from said remotely positionable submersible pump into said sewage collection chamber. The compacting plate may include a water channel that connects the water collection chamber to the sewage collection chamber.

The discharge pump of the system may be configured to pump water out of the water collection chamber. The system may further include a second discharge pump for pumping water out of said water collection chamber. Additionally, the remotely positionable submersible pump may be connected to the sewage waste storage tank by a suction hose and a suction hose boom.

The sewage slurry separation system may be positioned on a truck supporting said sewage waste storage tank.

Another embodiment of the mobile sewage slurry separation system includes a vehicle, a water collection chamber mounted on said vehicle, a sewage collection chamber mounted on said vehicle, a drainage channel connecting water collection chamber to said sewage collection chamber, and a means for pumping water out of said water collection chamber.

The drainage channel may be positioned at the top of the water collection chamber and sewage collection chamber.

The system may further include a remotely positionable means for pumping sewage slurry into the sewage collection chamber.

The remotely positionable means of pumping waste water into said sewage collection chamber may be a submersible pump connected to the sewage collection chamber by a suction hose. The means for pumping water out of said water collection chamber may be a submersible water pump. The means for pumping water out of the water collection chamber may be equal to or smaller than the remotely positionable means for pumping waste water into the sewage collection chamber.

The foregoing has outlined rather broadly the features and technical advantages of the present invention in order that the detailed description of the invention that follows may be better understood. Additional features and advantages of the invention will be described hereinafter which in addition to the above form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention together with further objects and advantages will be better understood from the following description when considered in connection with the accompanying figures. It is to be expressly understood, however, that each of the figures are provided for the purpose of illustration and description only and are not intended to define of the limits of the present invention.

BRIEF DESCRIPTION OF THE DRAWINGS

The advantages, features, and details of the invention are explained in greater detail in the following description of the preferred embodiment, with the aid of drawings as listed below. For a more complete understanding of the present invention, reference is now made to the following descriptions taken in conjunction with the accompanying drawing, in which.

DETAILED DESCRIPTION OF THE INVENTION

Upon review of the detailed description and the accompanying drawings provided herein, it will be apparent to one of ordinary skill in the art that mobile sewer slurry separation systems can be used in a number of different applications. Accordingly, the present invention is not limited to the structures specifically described and illustrated herein. The disclosed systems, however, are particularly adapted for sewer cleaning applications.

Figure 1:
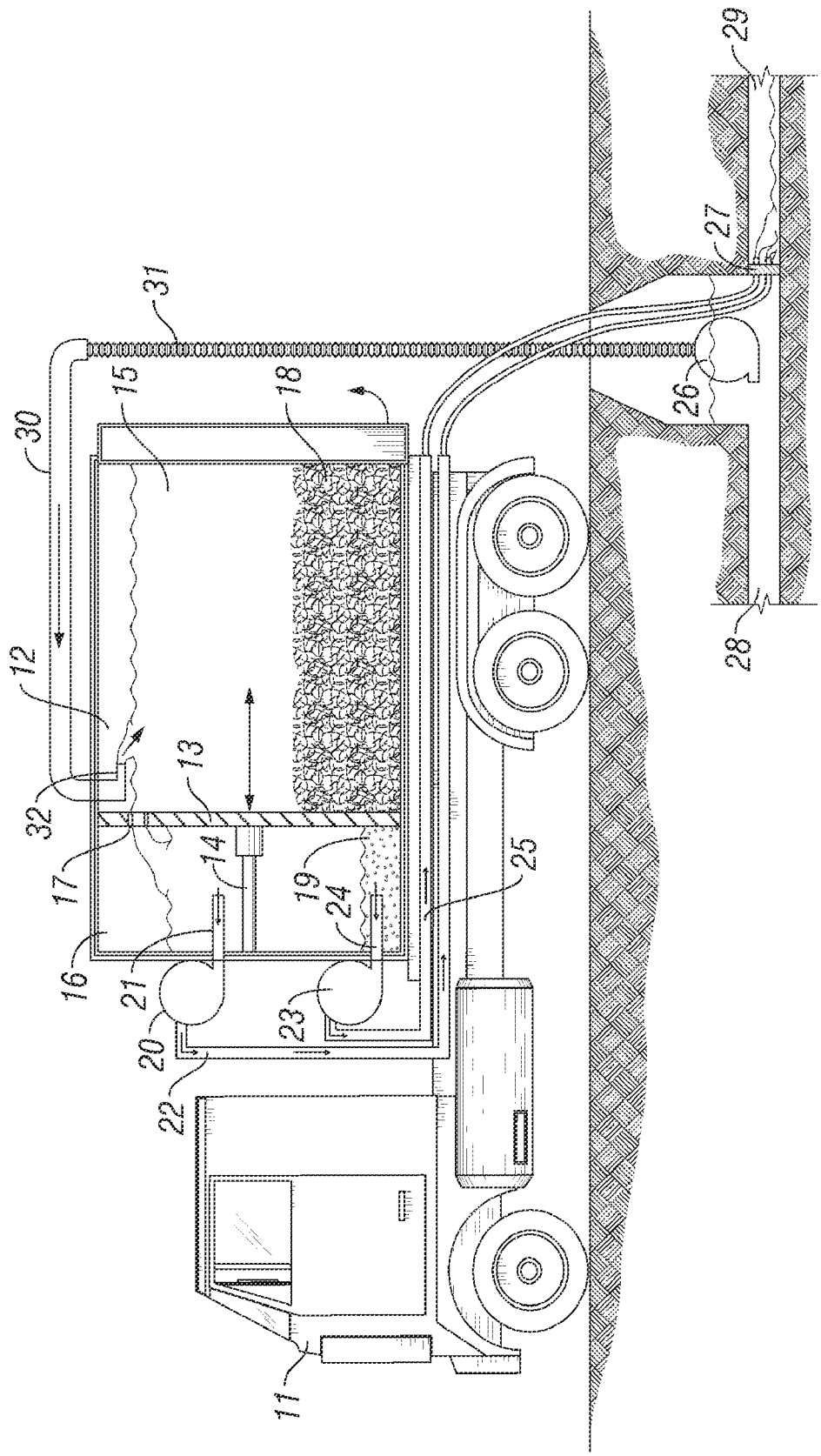
FIG. 1 is a side view of a mobile sewage slurry separation system.

FIG. 1 shows a mobile sewage slurry separation system (10). The preferred embodiment of the mobile sewage slurry separation system (10) includes a truck (11) for mounting and transporting the sewage separation system. Although a truck (11) is shown, sewage waste storage tank (12) could be mounted on a trailer, skids, or any other platform that allows for easy transportation.

The sewage waste storage tank (12) includes a compacting plate (13). Compacting plate (13) can be made of any suitable material and is designed to contain solid waste, compact solid waste, and allow fluid to migrate from the sewage collection chamber (15) to the water collection chamber (16). Compacting plate (13) is shaped to be received within the sewage storage tank. The gap between the edge of compacting plate (13) and sewage waste storage tank (12) should be small enough to prevent free flow of sewage slurry from sewage collection chamber (15) around the sides or bottom of compacting plate (13) into the water collection chamber (16). The gap should not be so small, however, that water cannot seep into the water collection chamber (16). Additionally, compacting plate (13) does not have to be a solid material. In one embodiment, compacting plate (13) is a water permeable mesh design. Alternatively, the plate can be a non-uniform design, such as solid at the bottom and mesh at the top.

Compacting plate (13) also includes an opening that allows water to flow from the sewage collection chamber (15) to the water collection chamber (16). In the preferred embodiment the opening is a water discharge channel (17). The water discharge channel (17) is located in the upper portion of the compacting plate (13). Although the water discharge channel is shown as a single channel, it can be any number of channels and any number of shapes. The primary criteria, however, is that water channel (17) allows low-slurry (dirty) water to pass into the water collection chamber (16). Water channel (17) is shown as a simple opening, but can be fitted with a filter or other means for filtering the water flowing into the water collection chamber (16). In a design in which compacting plate (13) is water permeable, such as the mesh design described above, water channel (17) may not be necessary, and may be omitted. Additionally, water channel (17) could be a cutout across the top of compacting plate (13). Water channel (17) may be positioned anywhere across the width of compacting plate (13). In one embodiment, water channel (17) is at the top of compacting plate (13) and is aligned with nozzle (32). In this manner, nozzle (32) passes through water channel (17) as compacting plate (13) moves rearward to compress solid waste (18).

Compacting plate (13) compresses solid waste (18) against the back of the sewage waste storage tank (12). In doing so, the solid waste is compacted and retained at the bottom, back of sewage collection chamber (15). While the compacting plate is compressing the slurry, the water squeezed out of the sewer slurry flows through water discharge channel (17) into water collection chamber (16). Additionally, the water can seep around compacting plate (13) into water collection chamber (16). Once the slurry has been compressed, the compacting plate returns to its original position, generally as shown in FIG. 1.

Water collection chamber (16) is configured with a water pump to pump water out of water collection chamber (16). In the preferred embodiment shown in FIGS. 1 and 2, the water pump is actually two pumps, an upper pump (20) and lower pump (23). The pumps are connected to output lines (22) and (25). Output lines feed into downstream sewer line plug (27) and discharge dirty water from the water collection chamber into a downstream portion of the sewer line (29) (upstream is shown as 28). The pumps draw water from the water collection chamber (16) through intake hoses (21) and (24).

Sewage slurry is pumped into the sewage waste storage tank (12) by a remotely positionable submersible pump (26). Submersible pump (26) is connected to waste storage tank (12) by suction hose (31) and boom (30). Truck (11) is shown positioned next to a manhole, but remotely positionable submersible pump (26) may be position away from truck (11). Indeed, an advantage of the disclosed system is the ability to remotely position submersible pump (26). In a preferred embodiment, submersible pump (26) is a six inch pump.

The slurry from submersible pump (26) is shown flowing through suction hose (31), boom (30), and nozzle (32) into sewage collection chamber (15). Nozzle (32) is designed to diffuse the velocity of the slurry pumped into the collection chamber (15) and to distribute it generally across the surface area of the sewage slurry already in collection chamber (15). Although a nozzle (32) is shown, in the preferred embodiment the slurry from submersible pump (26) is poured into the sewage collection chamber (15) without nozzle (32). Although nozzle (32) is shown positioned just aft of the compacting plate (13), the nozzle may penetrate into the sewage waste storage tank (12) at any point as long as the sewage slurry can be directed into sewage collection chamber (15).

The discharge pumps (20) and (23) are sized according to the capacity of submersible pump (26). Generally, the pumping capacity of the discharge pumps should be approximately the same as submersible pump (26). The lower pump (23) is shown positioned at the lower portion of water collection chamber (16). The lower pump intake line (24) draws water and sand/grit (19) from water collection chamber (16) and discharges it through output line (25). In the embodiment shown, the water and sand/grit (19) is discharged downstream of submersible pump (26). In normal operation, lower pump (23) is the only pump working. Upper pump (20) is connected to a float valve so that it automatically comes on when the water level rises to a pre-determined level within water collection chamber (16). Alternatively, upper pump (20) may be manually controlled.

Upper and lower pumps (20) and (23) are releasably connected to the sewage waste storage tank (12).

Figure 2:
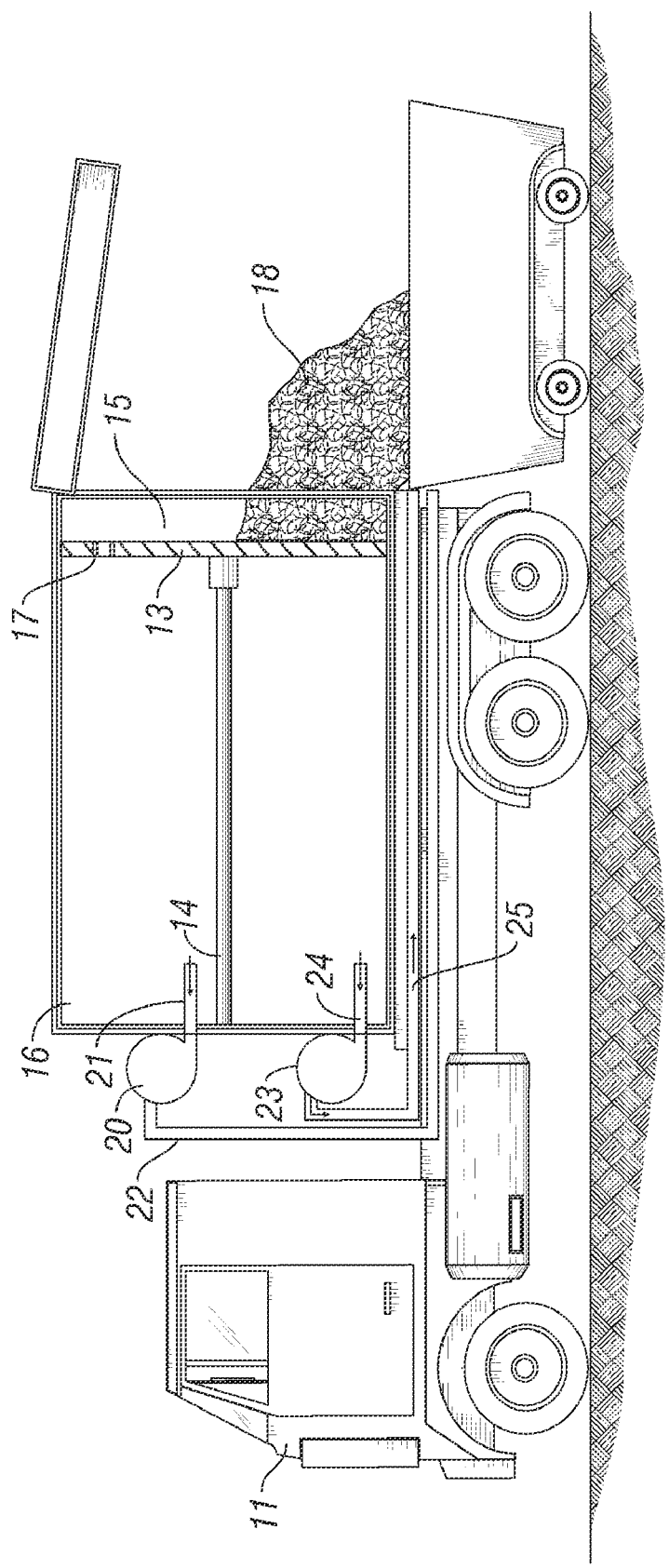
FIG. 2 is a side view of a mobile sewage slurry separation system emptying solid waste into a receiver tank.

FIG. 2 shows the sewage waste storage tank (12) being emptied into a drying tank. In a preferred embodiment, the sewage storage tank (12) is positioned high enough above the ground to clear the edge of the drying tank. When discharging waste, the back door of the sewage waste storage tank (12) is opened and the compacting plate pushes the solid particulate/sludge out the back.

For purposes of this application the sewage slurry generally comprises sludge/heavy particulates and dirty water. The sewage slurry pumped into the sewage waste storage tank (12) by the submersible pump (26) varies in consistency between a thick mud to dirty water. Once in the sewage collection chamber (15), the heavy particulates quickly settle leaving dirty water on top. The water that passes into the water collection chamber (16) is still sewage slurry, but does not contain the heavy particulates that have settled in the sewage collection chamber (15).

Although the present invention and its advantages have been described in detail, it should be understood that various changes, substitutions and alterations can be made herein without departing from the invention as defined by the appended claims. Moreover, the scope of the present application is not intended to be limited to the particular embodiments of the vehicles and the methods described in the specification. As one will readily appreciate from the disclosure, vehicles presently existing or later to be developed that perform substantially the same function or achieve substantially the same result as the corresponding embodiments described herein may be utilized. Accordingly, the appended claims are intended to include within their scope such articles and methods.

What is claimed is:

1. A sewage slurry separation system comprising,
a sewage waste storage tank with a front and a back;
a compacting plate movably positioned within said sewage waste storage tank, said compacting plate dividing said sewage waste storage tank into a water collection chamber and a sewage collection chamber;
a sewage inlet positioned to deposit slurry into said sewage collection chamber;
an upper water pump positioned at the front of said sewage waste storage tank and configured to pump liquid out of said sewage waste storage tank; and
a lower water pump positioned at the front of said sewage waste storage tank below said upper water pump and configured to pump liquid out of said sewage waste storage tank.

2. The sewage slurry separation system of claim 1, further comprising,
an upper input hose connected to said upper water pump and a lower input hose connected to said lower water pump, wherein said upper and lower input hoses are positioned relative to said sewage waste storage tank to pump water from the sewage slurry out of the sewage waste storage tank.

3. The sewage slurry separation system of claim 1, wherein said compacting plate includes a water discharge channel at the top of said compacting plate.

4. The sewage slurry separation system of claim 3, further comprising a remotely operated submersible pump configured to discharge sewage slurry into said sewage collection chamber through said sewage inlet.

5. The sewage slurry separation system of claim 1, wherein said lower water pump is positioned low enough in said water storage chamber to discharge sand and grit that builds up on the bottom of said water storage chamber.

6. The sewage slurry separation system of claim 5, wherein said upper water pump is connected to a float valve and automatically comes on when the water reaches said float valve.

7. The sewage slurry separation system of claim 1, wherein said sewage slurry separation system is mounted on a truck.

8. A sewage slurry separation system comprising,
a sewage waste storage tank;
a remotely positionable pump with an input and an output, wherein said output is connected to said sewage waste storage tank;
a compacting plate movably positioned inside said sewage waste storage tank, said compacting plate shaped to conform to a portion of said sewage waste storage tank wherein said compacting plate divides said sewage waste storage tank into a sewage collection chamber and a water collection chamber and wherein the output of said remotely positionable pump directs slurry into said sewage collection chamber; and
a first discharge pump configured to pump water out of said water collection chamber; and
a second discharge pump spaced from said first discharge pump and configured to pump water out of said water collection chamber.

9. The sewage slurry separation system of claim 8, further comprising,
a flow nozzle that directs the sewage slurry from said remotely positionable pump away from said first discharge pump as it enters the sewage waste storage tank.

10. The sewage slurry separation system of claim 9, wherein said first discharge pump is configured to pump water out of said water collection chamber.

11. The sewage slurry separation system of claim 10, wherein said compacting plate includes a water channel that connects the water collection chamber to the sewage collection chamber.

12. The sewage slurry separation system of claim 11, further comprising a truck supporting said sewage waste storage tank.

13. The sewage slurry separation system of claim 12, wherein said remotely positionable pump is connected to said sewage waste storage tank by a suction hose and a suction hose boom.

14. A mobile sewage slurry separation system comprising a
a vehicle;
a water collection chamber mounted on said vehicle;
a sewage collection chamber mounted on said vehicle;
a movable compacting plate dividing said water collection chamber and said sewage collection chamber, wherein the size of said sewage collection chamber varies with the position of said movable compacting plate;
a drainage channel through said compacting plate connecting said water collection chamber to said sewage collection chamber; and a first pump configured to pump water out of said water collection chamber; and a second pump positioned above said first pump and configured to pump water out of said water collection chamber.

15. The mobile sewage slurry separation system of claim 14, wherein said drainage channel is positioned at the top of said water collection chamber and said sewage collection chamber.

16. The mobile sewage slurry separation system of claim 14, further comprising a remotely positionable means for pumping sewage slurry into said sewage collection chamber.

17. The mobile sewage slurry separation system of claim 14, wherein said first pump is equal to or smaller than said remotely positionable means for pumping waste water into said sewage collection chamber.

* * * * *